United States Patent [19]

Bateson et al.

[11] Patent Number: 4,459,675

[45] Date of Patent: Jul. 10, 1984

[54] PRINTER CONTROL SYSTEM WITH ERROR COUNT AVERAGING

[75] Inventors: John E. Bateson, Carrollton, Tex.; Samuel E. Bigbie, Auburn, Ala.; Barry R. Cavill; Albert A. Nawy, both of Boca Raton, Fla.

[73] Assignee: International Business Machines Corporation, Armonk, N.Y.

[21] Appl. No.: 312,057

[22] Filed: Oct. 16, 1981

[51] Int. Cl.³ .............................................. G06F 15/46
[52] U.S. Cl. .................................. 364/519; 318/603; 364/174; 364/183
[58] Field of Search ............... 364/519, 400, 130, 154, 364/167, 174, 183; 400/279, 322; 318/341, 345 E, 561, 590, 591, 592, 594, 601, 603, 604, 606, 607, 608, 615–618, 632

[56] References Cited

U.S. PATENT DOCUMENTS

| | | | |
|---|---|---|---|
| 4,021,650 | 5/1977 | Ruble | 364/174 X |
| 4,143,310 | 3/1979 | Fujinawa et al. | 318/603 X |
| 4,146,922 | 3/1979 | Brown et al. | 364/118 |
| 4,147,967 | 4/1979 | Aiena | 318/341 |
| 4,332,492 | 6/1982 | Thern et al. | 400/322 X |
| 4,353,020 | 10/1982 | Veale | 318/603 X |

Primary Examiner—Joseph F. Ruggiero
Attorney, Agent, or Firm—Walter J. Madden, Jr.

[57] ABSTRACT

In a control system for a bidirectional printer capable of printing at different speeds on different lines and in which the actual velocity of the print carriage is compared with a desired velocity profile to generate an error count, the error count is measured and averaged out for each direction and speed of carriage movement to compensate for the effect of changes in the printer system dynamics such as aging, wear, debris buildup, etc.

3 Claims, 8 Drawing Figures

PRINTER CONTROL SYSTEM WITH ERROR COUNT AVERAGING

CROSS REFERENCE TO RELATED APPLICATION

Features disclosed but not claimed herein are claimed in copending application Ser. No. 312,058, filed Oct. 16, 1981, assigned to the same assignee as the present application.

BACKGROUND OF THE INVENTION

1. Field of the Invention

This invention relates to printer control systems and relates more particularly to control systems for multi-speed bidirectional printers.

2. Description of the Prior Art

A multi-speed bidirectional printer is a device in which a print carriage containing a printing mechanism is driven past a medium on which printing is to take place, the carriage and printing mechanism being controllable to move at different speeds on different lines and being capable of printing in both directions. In printers of this type, it is necessary to accelerate the carriage in the margin area of the medium so that it is up to the required speed when it reaches the printing area, maintain the desired speed as the carriage traverses a line in the printing area; and then decelerate the carriage for stopping or stopping and turning around at the end of the printing line. In such a system, it is important for printer throughput purposes that the acceleration and deceleration be carried out as rapidly as possible and that the speed during printing be substantially constant.

One factor which makes realization of these performance goals difficult to achieve over the life of a printer is that the printer system's dynamics often change from machine to machine and as a function of time as components wear and age. Hence, a control system which is capable of providing optimal control early in the life of a given printer may not be capable of such control later in the life of that printer or with another printer which is seemingly identical to that printer, but which has slightly different characteristics.

An additional factor which makes it difficult to attain these goals is that even at the same speed, a printer may have different characteristics depending on which direction it is running, thus making it harder to develop a control algorithm for a common printing speed.

Prior Art

U.S. Pat. Nos. 4,146,922 and 4,147,967 disclose the use of microprocessors to control a print carriage. However, neither of these patents address the problem solved by the present invention.

SUMMARY OF THE INVENTION

In accordance with the present invention, a printer control system is provided in which an error count, which provides a digital measure of the difference between a desired velocity and the actual velocity, is updated for each line printed so as to maintain the error count at a minimum value for the next line to be printed.

DESCRIPTION OF THE PREFERRED EMBODIMENT

Figure 1:
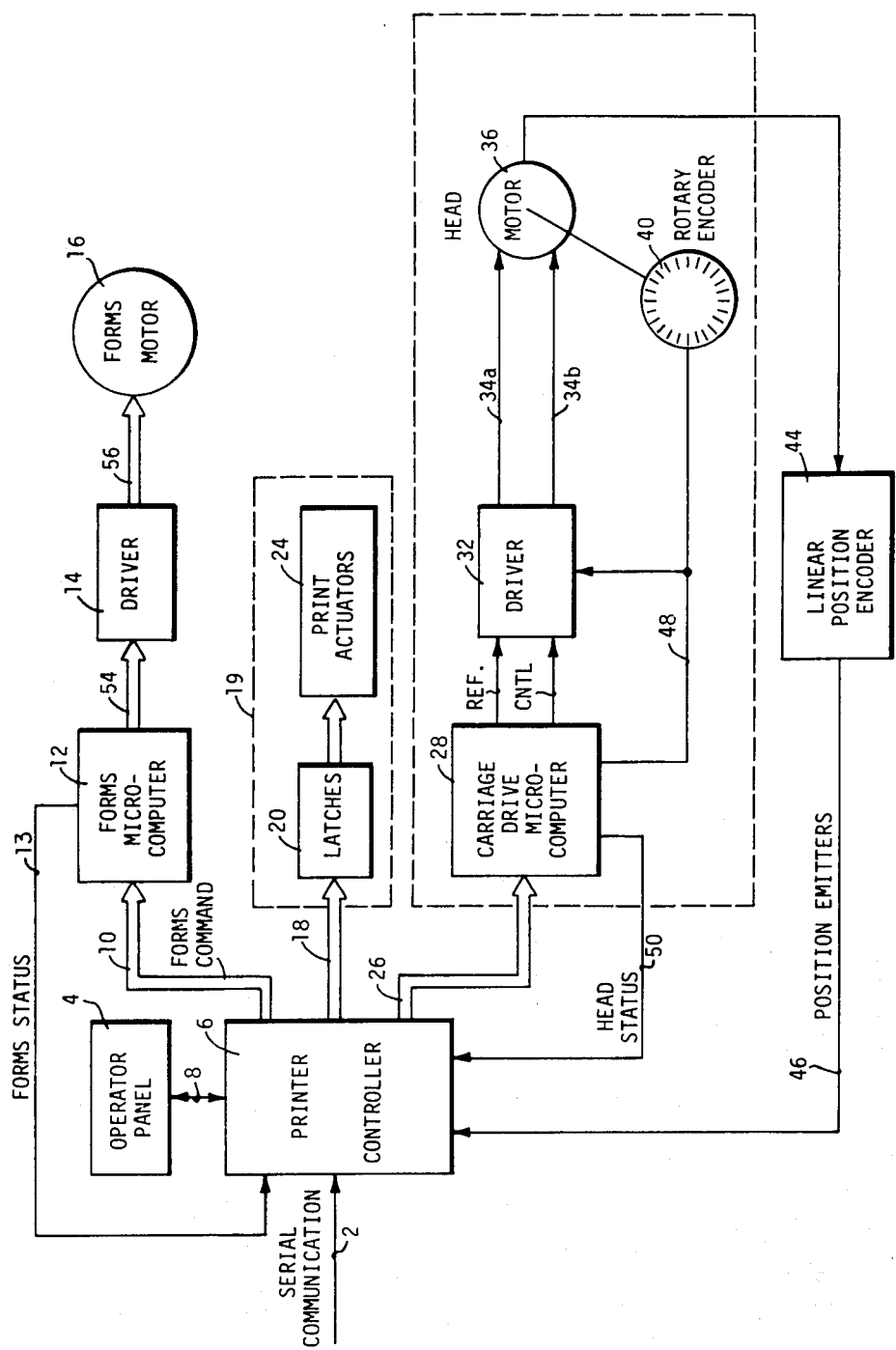
FIG. 1 is a diagram of the overall printer control system.

The present invention is used with a printer system shown in FIG. 1. This printer system receives commands via a serial communications link 2 which are decoded by the printer controller 6 and used in conjunction with status set by an operator panel 4 connected to controller 6 by a panel cable 8. Controller 6 may be of the type shown in copending application Ser. No. 086,484, filed Oct. 19, 1979, entitled "Printer Subsystem With Microprocessor Control". The controller commands are supplied by way of a cable 10 to a forms microcomputer 12 in the form of a single chip microcomputer which supplies open loop drive commutation signals to a power driver 14. The power driver provides drive voltage to a forms stepper motor 16. The command to move is given to forms microcomputer 12 by way of command lines on cable 10 from printer controller 6, and status is returned to the printer controller by way of the forms status lines 13.

The print actuator system 19 attached to the print head carriage includes actuator latches 20 and print actuators 24 and does the actual print image formation of the images formed by printer controller 6. The dot pattern to be printed is transmitted from controller 6 to latches 20, and then to actuators 24. The dot placement for the characters printed is determined by printer controller 6, based on information from a linear position encoder system attached to the print head carriage system 38.

Actuator carriage position is determined by a linear position encoder 44 which may include an optical detector attached to the carriage which is driven by the head motor system and a stationary optical grid attached to the printer frame, as is well known in the art. The carrier assembly is attached to the print head drive motor 36 by a timing belt and as the carrier moves, the attached optical detector moves across the grid and generates position emitter signals on a line 46 which are used by printer controller 6 to form characters.

The actuator carriage print head motor drive system 38 includes a carriage drive microcomputer 28 and a power driver 32 attached to brush DC head motor 36 by way of cables 34a, 34b. Attached to the shaft of head motor 36 is a rotary optical encoder 40 with 810 cycles per revolution. This encoder is used by carriage drive microcomputer 28 to provide speed information. Instructions for controlling the print head motion are given to microcomputer 28 via command lines 26 and status is returned to printer controller 6 by means of status lines 50.

Figure 2:
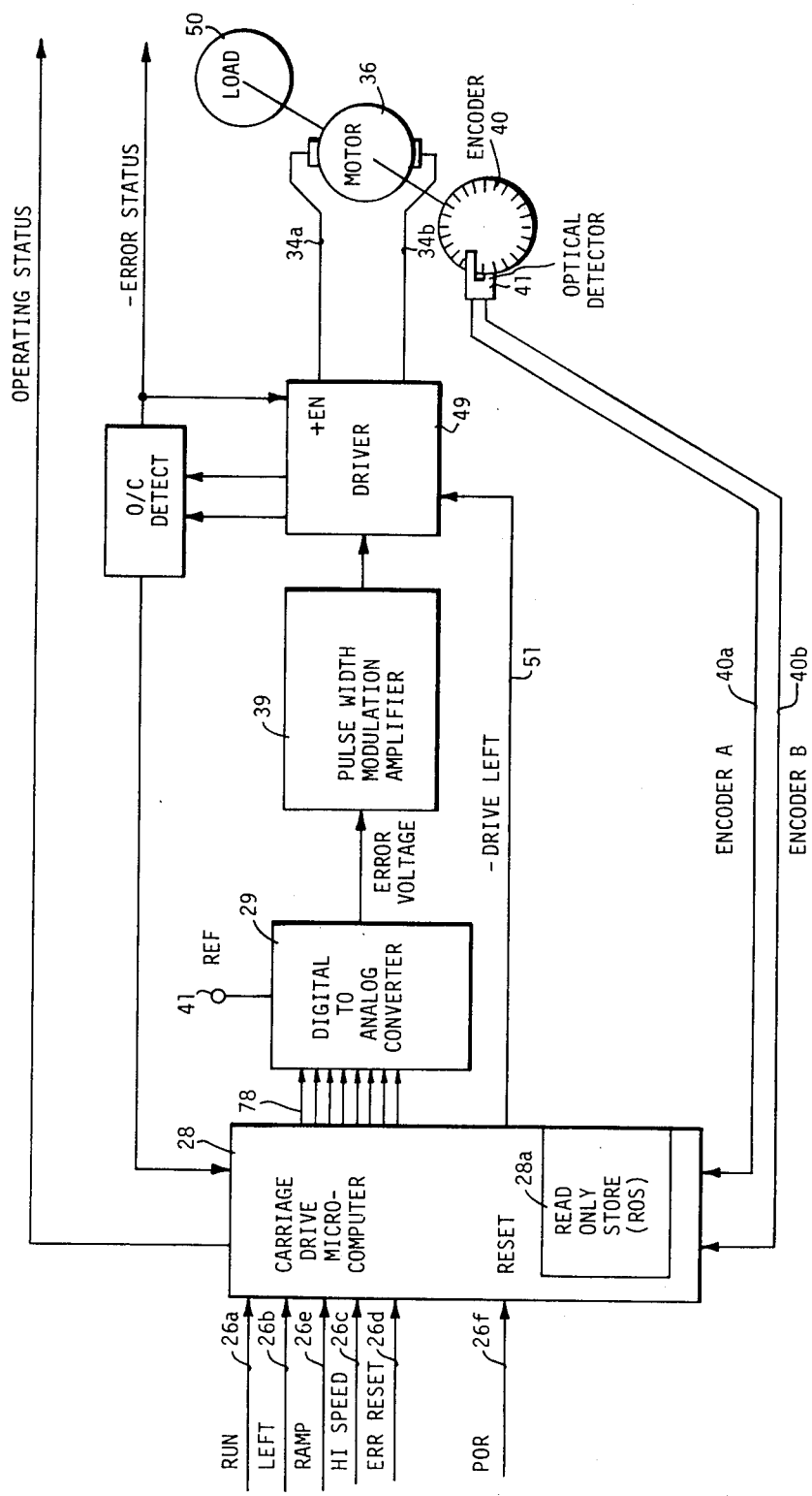
FIG. 2 is a diagram illustrating details of the printer carriage control system.

The head drive system 38 is seen in more detail in FIG. 2. The carriage drive microcomputer 28 may be a single chip Intel 8049 microcomputer. As shown, microcomputer 28 is provided with a portion of read-only storage (ROS) 28a. Movement commands on line 26 are received and decoded by the carriage drive microcomputer. These commands are negative active run, go left (or plus go right), select negative active high speed (or positive active low speed), and reset error condition. The status reported to printer controller 6 by way of status lines are minus active head error and plus active carriage drive microcomputer busy.

Actuator carriage motion is initiated by providing an error voltage to the head motor drive circuitry, this error voltage being developed by the microcomputer. The microcomputer outputs an 8-bit digital value to a digital to analog converter (DAC) 29 such that a portion of a reference voltage appearing at a terminal 41 is transmitted to a pulse width modulator 39 as the error voltage. The error voltage is used by pulse width modulation amplifier 39 to develop a chopped DC control signal with the plus duty cycle increasing as the error voltage increases. The duty cycle signal determines the percentage of time that the drive voltage is applied to motor 36 through the wires 34a, 34b. This pulse width modulated DC signal provides the mechanism to accomplish speed control in the system. The direction of application of drive voltage to motor 36 is determined by the controlling output—drive left from microcomputer 28 on line 51 to the power drive transistors 49. This permits bidirectional drive to motor 36 which allows controlled bidirectional (left to right and right to left) of the attached load 58 which is the actuator carriage or print head. Motor overcurrent is sensed and when activated disables the drive and notifies the carriage control microcomputer.

Speed information to be used in controlling the actuator carriage velocity is obtained by monitoring the outputs of two symmetrical optical encoders that are phase shifted from one another by ninety degrees; encoder "A" 40a and encoder "B" 40b. These encoder signals are developed from the optical disk 40 monitored by the optical detector 41 attached to the motor housing.

As mentioned above, printer controller 6 communicates with carriage drive microcomputer 28 via command lines 26 (FIG. 2). The Reset command causes a reset of the error status line. A Diagnostic command from the printer controller 6 causes the carriage drive microcomputer 28 to perform a set of internal hardware verification diagnostics and to report an error status or satisfactory completion status. This ensures proper operation of the microcomputer and aids in printer error isolation. The motion commands received from the printer controller 6 are either drive at detent speed (a very low speed) in the direction commanded or run at either high or low speed in the direction selected. These two commands will be combined in further explanation of a "Run" command.

Figure 3:
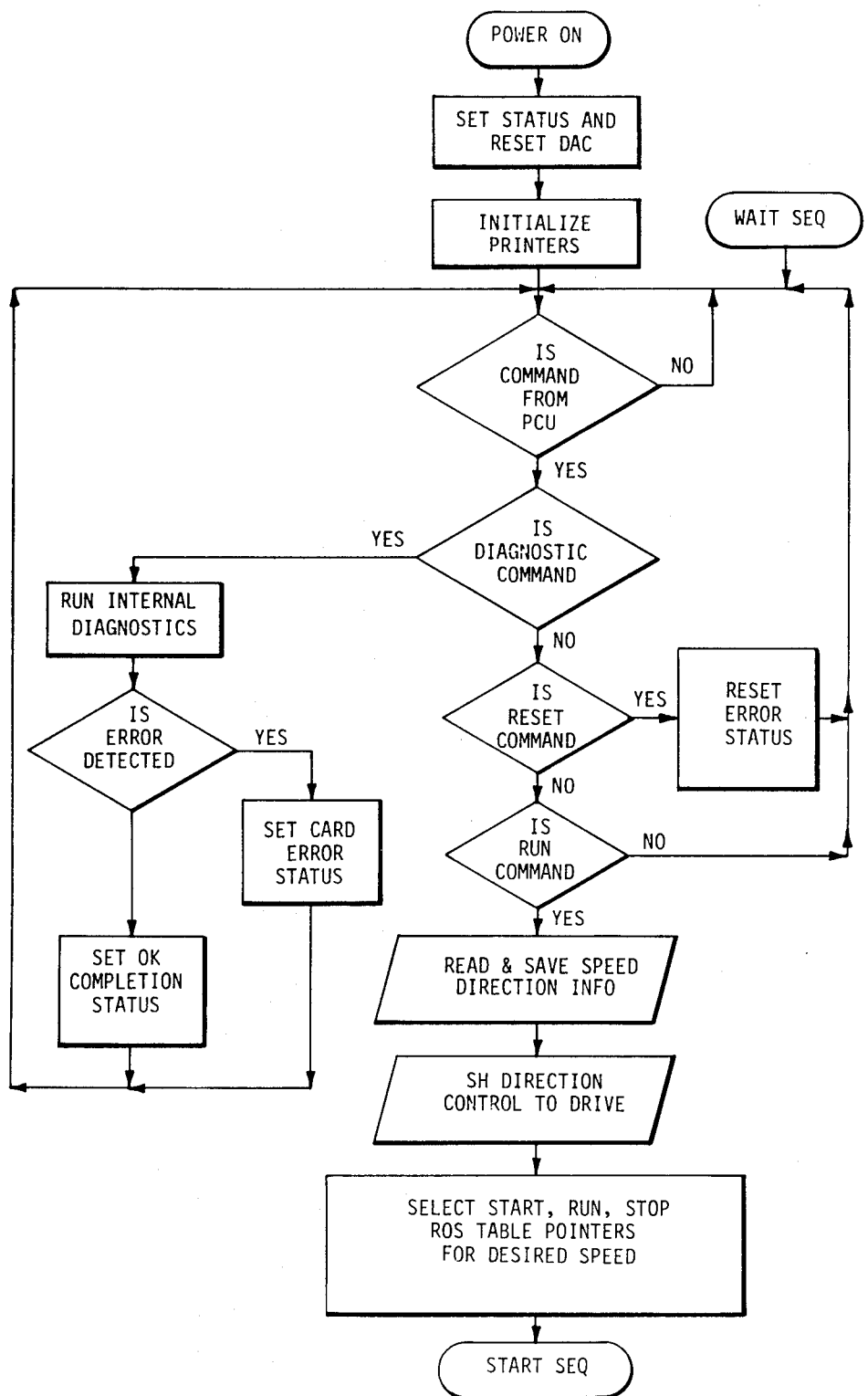
FIGS. 3-6 are flow charts illustrating the sequence during start, run and stop operations.

Motion begins when a Run command is received by microcomputer 28 from the printer controller, as shown in the Command Decode flowchart in FIG. 3. Speed and direction information is read and stored. The drive direction line ("-Drive Left") is set to the desired motion direction. The speed select lines are then used to select the starting, running, and stopping table pointers in ROS 28a for the desired speed, and an initial value for the error voltage is sent to DAC 29.

Figure 4:
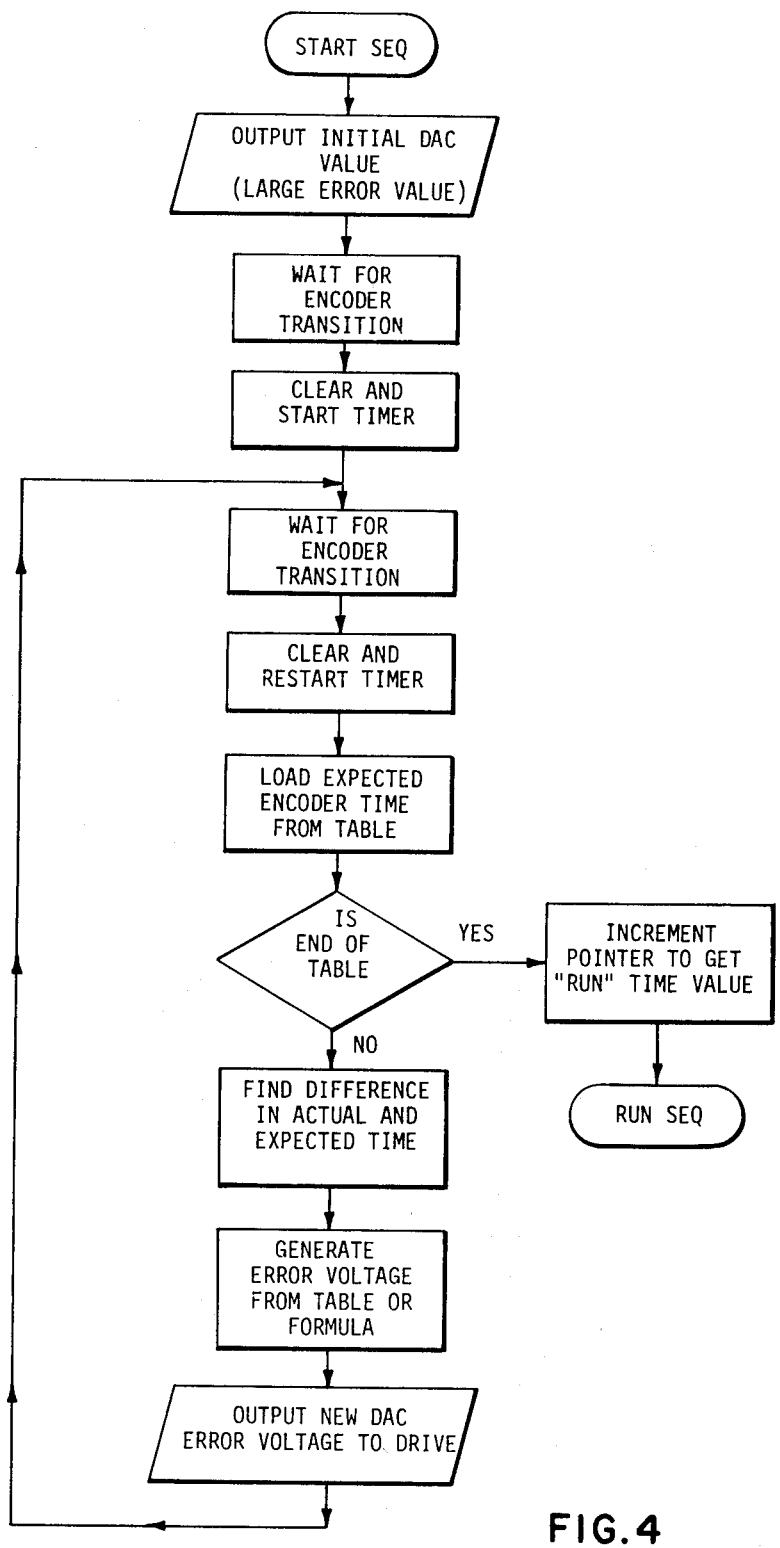

Once the DAC voltage has been applied, microcomputer 28 waits until a change in the encoder signals from encoder 40 occurs as seen in the Start Sequence Flowchart in FIG. 4. Then timing is started and microcomputer 28 waits till the next transition occurs. Symmetry and quadrature variations in the encoder signals may make it necessary to measure from one edge transition to the next same transition (rising to rising or falling to falling) of only one encoder. Each time the desired transition is reached, the timer value is read and reset. The time required to move this encoder cycle is compared to a stored value in ROS 28a. This ROS time value represents the desired current motion velocity at this point in the acceleration (start) process. The ROS time value for each encoder change (or group of encoder changes) is stored in a sequential table to allow easy access. The pointer to the ROS value being used from this table changes depending upon the number of encoder transitions counted from zero velocity.

The difference in the actual measured time and the desired encoder time from ROS 28a is measured and is used to generate a correction to the DAC error voltage. If the velocity is too large, the error voltage generation algorithm will decrease the DAC error voltage, and if the velocity is not enough, this algorithm will increase the DAC error voltage. The ROS table sequencing, time measurement, and error voltage correction cycle will continue until a table ROS value of 0 is reached. This indicates that starting is completed, the next ROS value in the table is the steady state run value for the speed selected. The ROS table selected and final velocity time value are different for each speed selected.

Figure 5:
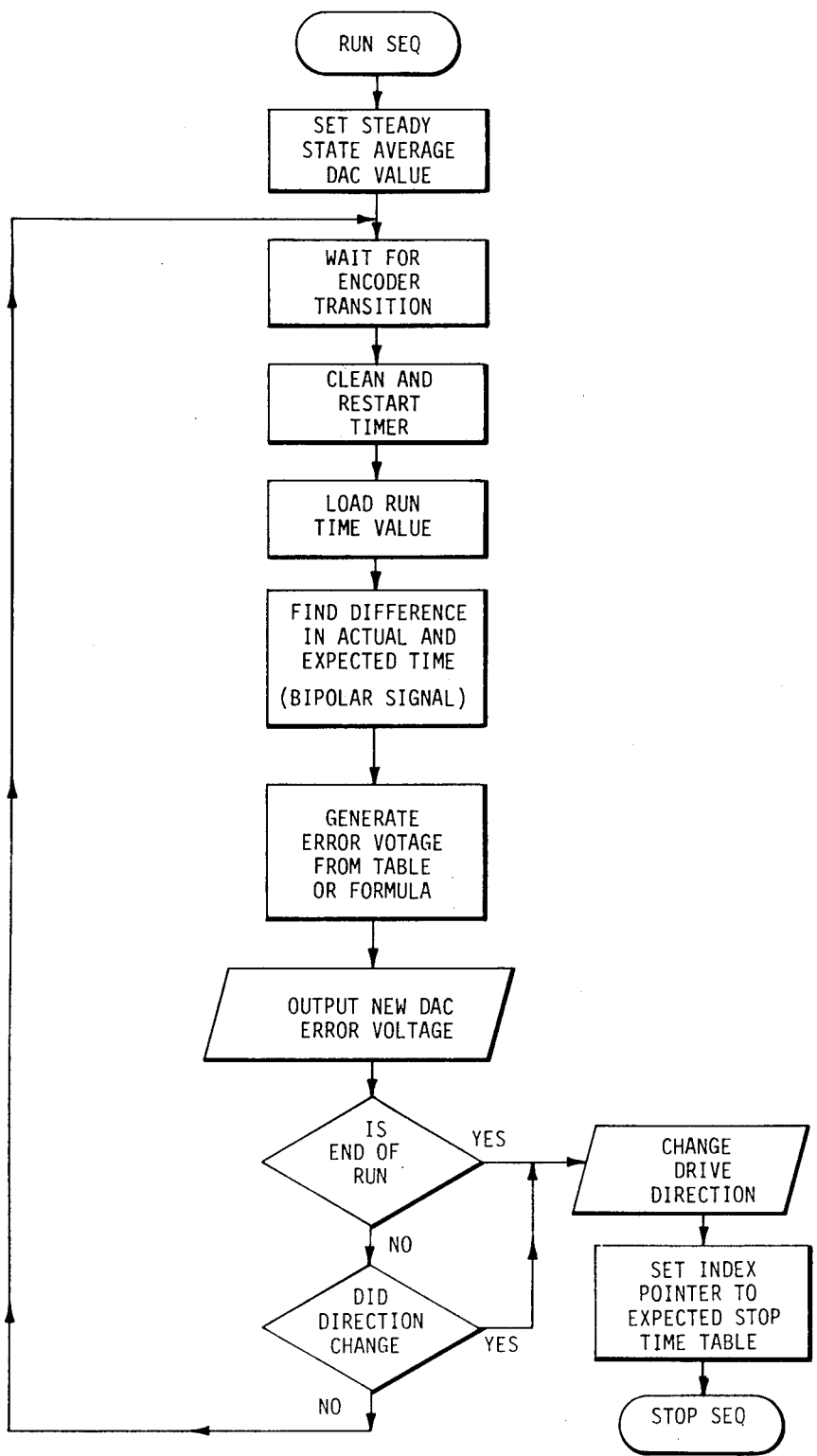

When the final desired speed has been reached, the run sequence program, as shown in the flowchart of FIG. 5, maintains the desired speed. The encoder output signals are monitored and the DAC error output voltage is modified to ensure that sufficient drive is maintained to overcome friction and loading effects. The initial value set into DAC 29 when run motion is started is the steady state average error count as determined by an error averaging algorithm.

While running, each encoder change is timed as before. The measured time (velocity) value is compared with the expected time (desired velocity). The difference is used by the error voltage generation algorithm to decrease the DAC voltage if the speed is too large, or increase the DAC voltage if the speed is too slow. The microcomputer tests the input commands and if the run signal is no longer active or the direction command line has changed state, stopping begins. If no change is detected, constant velocity speed control continues.

Figure 6:
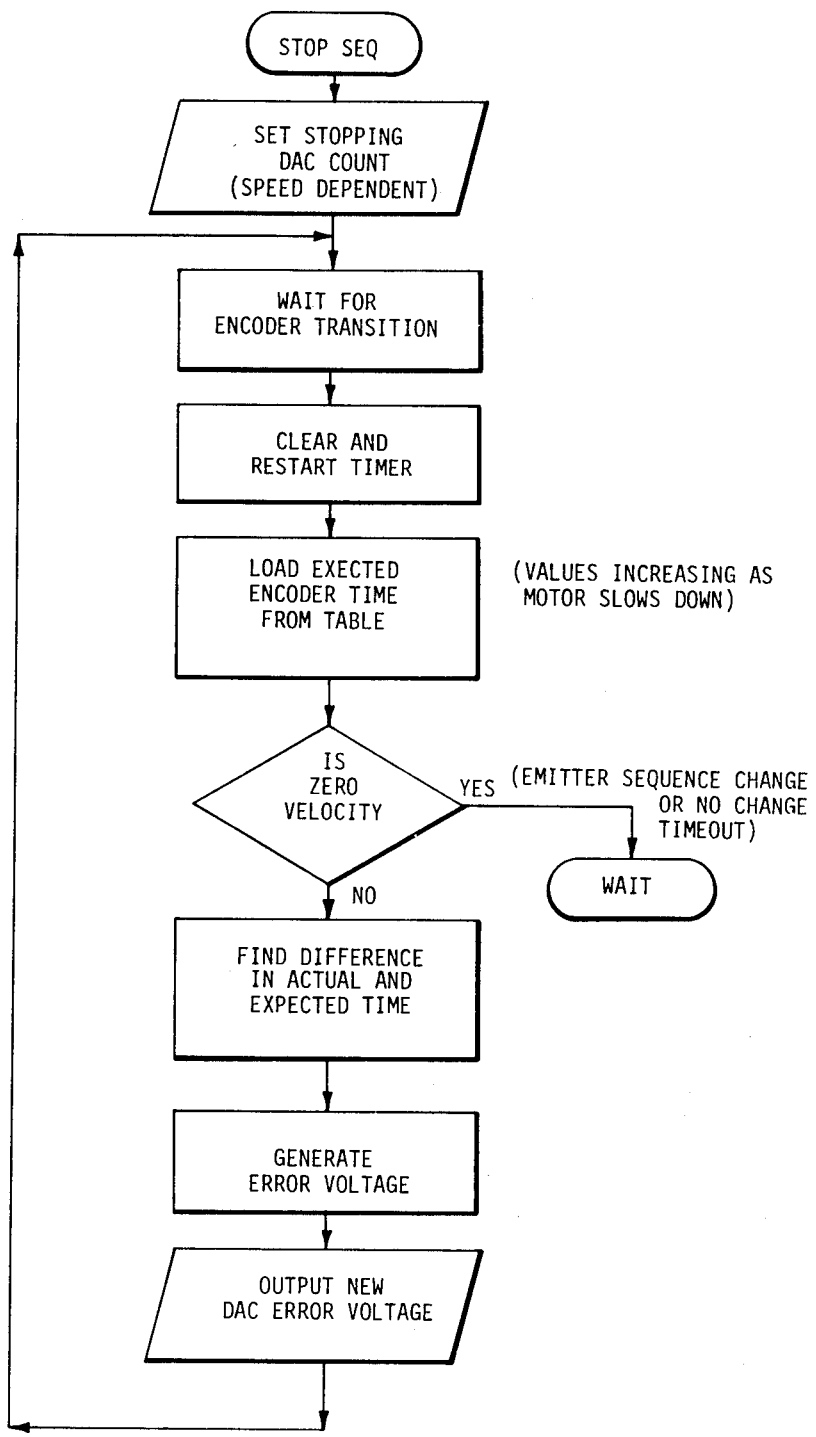

The motor drive direction ("-Drive Left") is changed and the stop sequence begins as shown in the flowchart of FIG. 6. Then the initial DAC reverse drive count is transmitted to the DAC. This induced large error voltage value (speed dependent) causes the motor to drive in the opposite direction. Then the table of ROS stopping values is accessed, as seen in FIG. 6. The time between encoder transitions (same edge to same edge as before) is measured and compared with the desired ROS time (speed) value. When the time between encoder changes becomes excessively long or the encoder sequence changes, then zero velocity has been achieved and the command input lines are sampled. Until zero velocity has been achieved, the difference in the measured and desired time values is used by the error voltage generation algorithm to increase or decrease the DAC error voltage and continue stopping. The ROS stopping table pointer changes depending on the number of encoder transitions counted since stopping began. Once stopping is completed, motion may then begin again in either direction desired.

The error voltage generation algorithm takes the time error between the measured and desired encoder signals and determines the output DAC error voltage. The error voltage may be calculated using a formula or may be evaluated by using look-up tables, but the net results are the same. A basic principle behind either method is the concept of non-linear error signal scaling, which requires the microcomputer to change the time difference versus error voltage formula (relationship) depending on whether starting, running, or stopping is taking place.

When first starting motion, the encoders come at a very slow rate. This means that when the time difference between actual and desired velocity is evaluated, the time value may be large. However, a large resultant change in the DAC error voltage at that time is not desirable since fast acceleration is dependent on a large DAC error voltage. Therefore, the time value measured is divided down (or scaled) so that only a small portion of the time measures is used to change the DAC value, bit for bit (one data bit changes one DAC bit). As speed increases, the acceleration control on the DAC becomes more important to prevent overshoot of final velocity. Therefore, time differences measured at about half of final speed should have more effect in the DAC output. This is accomplished by dividing down (scaling) the time values less, such that a time value at high speed will cause more of a DAC value change than at low speed. Finally, when approaching final velocity, the time difference between the measured and desired velocities is not scaled at all or only slightly. This increases the gain of the system providing better speed regulation. For starting, the scale factor changes are dependent on the velocity as reflected in the measured time or as the number of encoder transitions since starting began.

Once final velocity is reached, the scaling changes stop and the time differences translate almost bit for bit into DAC output value changes. When stopping, the scaling changes again begin, but the weighting factors are different. When beginning to stop, the encoders are changing fast and the difference values are small. Scaling takes place here but the scaling magnitude is small compared to starting motion. Then as velocity decreases, the scaling decreases. This means that the difference values calculated are transmitted to the DAC, decreasing the error voltage drive as the motor slows down. Once low velocities are reached (as determined by measured encoder times) the scaling again increases. This final scaling increase is to insure that the large time difference values do not cause overshoot of zero velocity.

Figure 7:
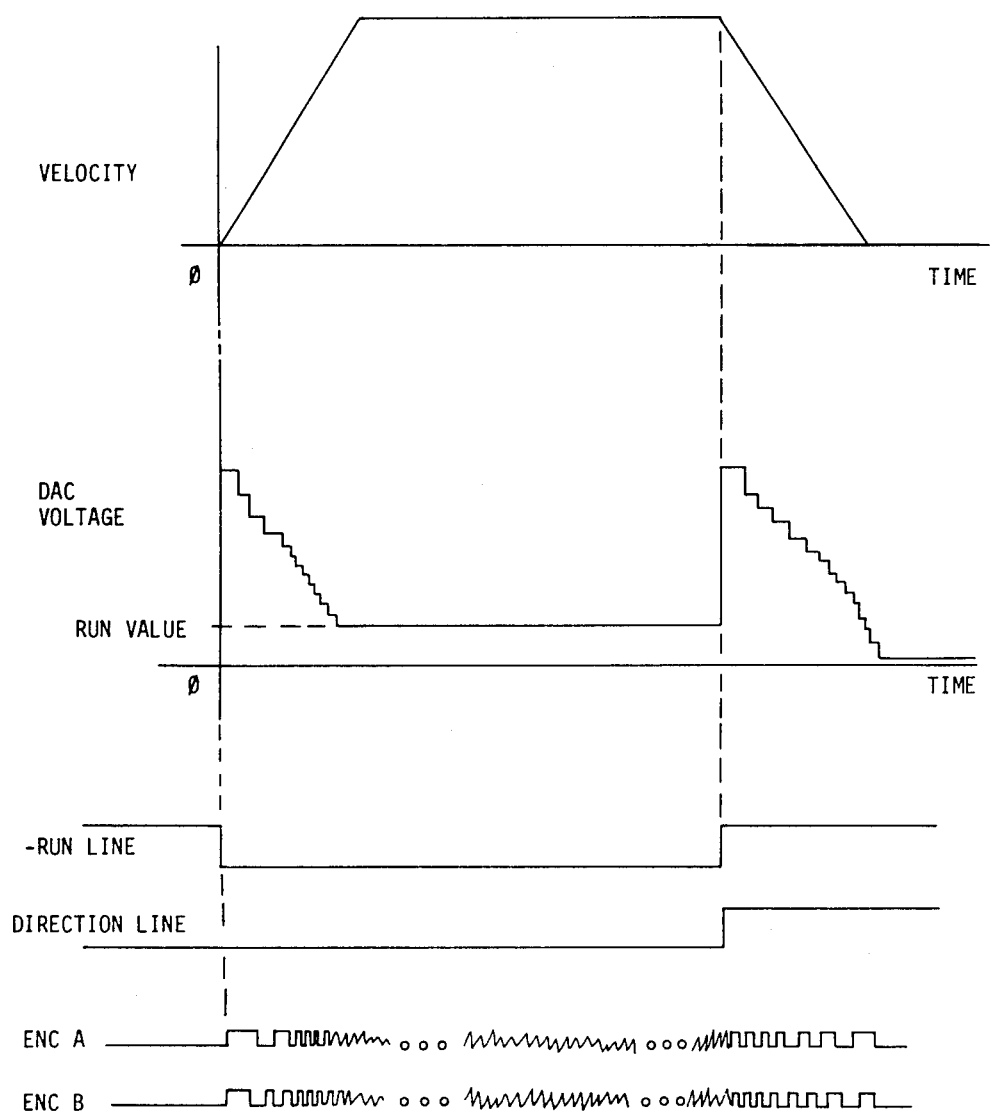
FIG. 7 is a graph illustrating different outputs during start, run and stop operations.

A typical velocity and DAC output profile is shown in FIG. 7, illustrating the DAC error voltage stepping down to the run level, and showing the decreasing spacing in the encoder A and encoder B signals as the carriage approaches run speed. If a turnaround was desired instead of stopping, the stopping sequence scaling would be slightly different and a special turnaround scaling and ROS velocity time value table would be required.

Figure 8:
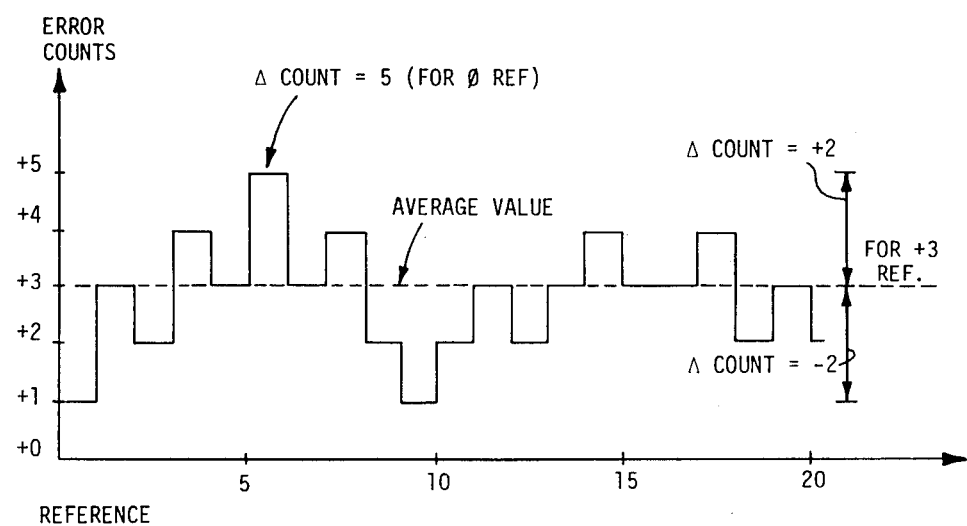
FIG. 8 is a graph illustrating averaging of the error counts in the control system.

Since the speed error at full speed is due to friction (once overshoot and undershoot have settled out), the error count (which is the DAC input) can be averaged over the run time. This average value is determined by an error averaging algorithm and can be used to adjust the nominal reference value for the next line to be printed. If bidirectional differences occur, it is possible to have different values for each direction and also different values for each operating speed. FIG. 8 shows a typical averaging operation. For this example, the error count varies from 1 to 5 counts from the reference. If the reference is updated by the average error over this period (in this case 3 counts), then the maximum error is only plus or minus 2 counts,

We claim:

1. Print head control means for controlling the velocity of a print head which is bidirectionally movable across a print line on a record medium comprising:
   motor means having a rotatable shaft for moving said print head;
   means coupled to said shaft for providing movement signals manifesting increments of rotation of said shaft;
   processor means for comparing the time between said movement signals with stored data to generate an error count;
   control means responsive to said error count to generate an error voltage; and
   motor control means responsive to said error voltage for controlling the rotational speed of said shaft;
   said processor means periodically updating said stored data in accordance with variations in said error count to compensate for dynamic system changes;
   said processor also averaging said error count for each line printed and updating said stored data based on said average error count for controlling the velocity of said print head on the subsequent line.

2. Apparatus in accordance with claim 1 in which separate values of said stored data are maintained for each direction of printing.

3. Apparatus in accordance with claim 2 in which said print head can move at different velocities on different printing lines and separate values of said stored data are maintained for each different velocity.

* * * * *